Dec. 24, 1940.  G. L. LARISON  2,226,100
VEHICLE WHEEL MOUNTING
Filed Sept. 5, 1939  5 Sheets-Sheet 4

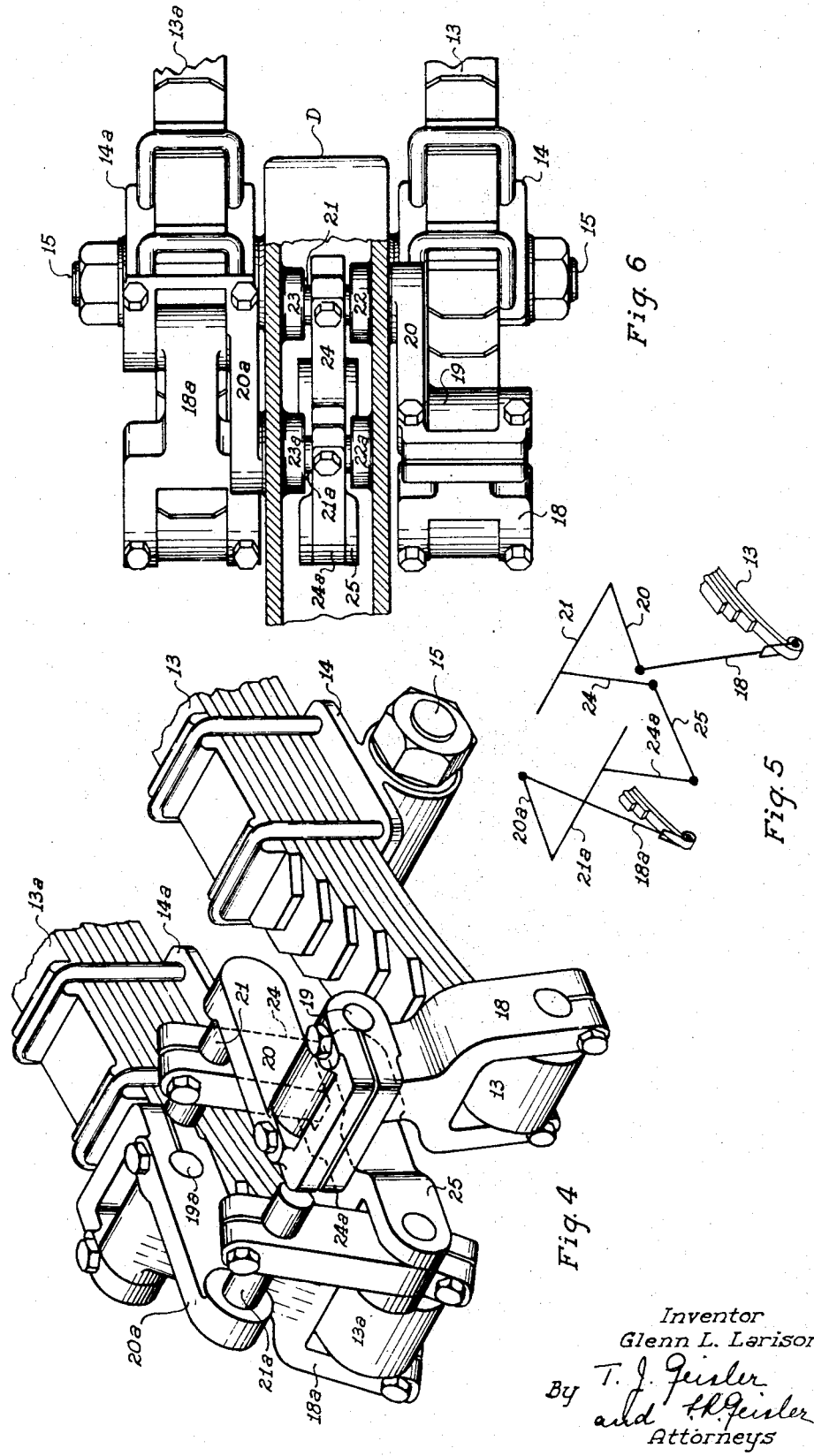

Inventor
Glenn L. Larison
By T. J. Geisler
and F. K. Geisler
Attorneys

Inventor
Glenn L. Larison

Patented Dec. 24, 1940

2,226,100

UNITED STATES PATENT OFFICE 2,226,100

VEHICLE WHEEL MOUNTING

Glenn L. Larison, La Grande, Oreg., assignor to Larison Compensating Axle Corporation, a corporation of Oregon Application September 5, 1939, Serial No. 293,441

12 Claims. (Cl. 280—124)

This invention relates to vehicle wheel mountings of the compensating type in which wheels are provided in pairs, with the mounting for each wheel of the pair so arranged that one wheel may be raised separately above the other with the two wheels always remaining in the same parallel planes and each wheel at all times carrying its share of the load.

More specifically, this invention relates to wheel mountings of this nature in which particular provision is made for cushioning sudden shocks on either or both wheels of the pair, such as described in my United States Letters Patent, No. 2,170,454, issued on August 22, 1939, entitled, "Shock reducing and cushioning wheel mounting for vehicles" to which reference is to be made, and this present invention involves further modifications of and improvements in such wheel mountings.

The purpose of this invention is to provide further practical and sturdy wheel mountings which will attain the objects set forth in my said United States Patent, No. 2,170,454, and also in my pending application, Serial No. 223,275, filed under date of August 5, 1938. However, the construction comprising my present invention employs parallel pivotally-mounted leaf springs, one spring for each wheel assembly, with the pair of springs interconnected in such manner that an upward movement of one wheel assembly will cause a force to be exerted in the opposite direction on the other assembly.

The particular means by which I attain this and incidental objects in this invention, and the manner in which the parallel pivotally-mounted members are connected and function, will be explained in the following description with reference to the accompanying drawings.

In the drawings:

Figure 4 is a fragmentary isometric view of the coupling mechanism and connected portions of the resilient or spring members for a pair of wheel assemblies;

Figure 5 is an explanatory diagram of the linkage illustrated in Figure 4;

Figure 6 is a fragmentary sectional plan taken on oblique plane indicated by line 6—6 in Figure 1 and further illustrating the coupling mechanism connecting the end of the two spring members;

Figure 1:
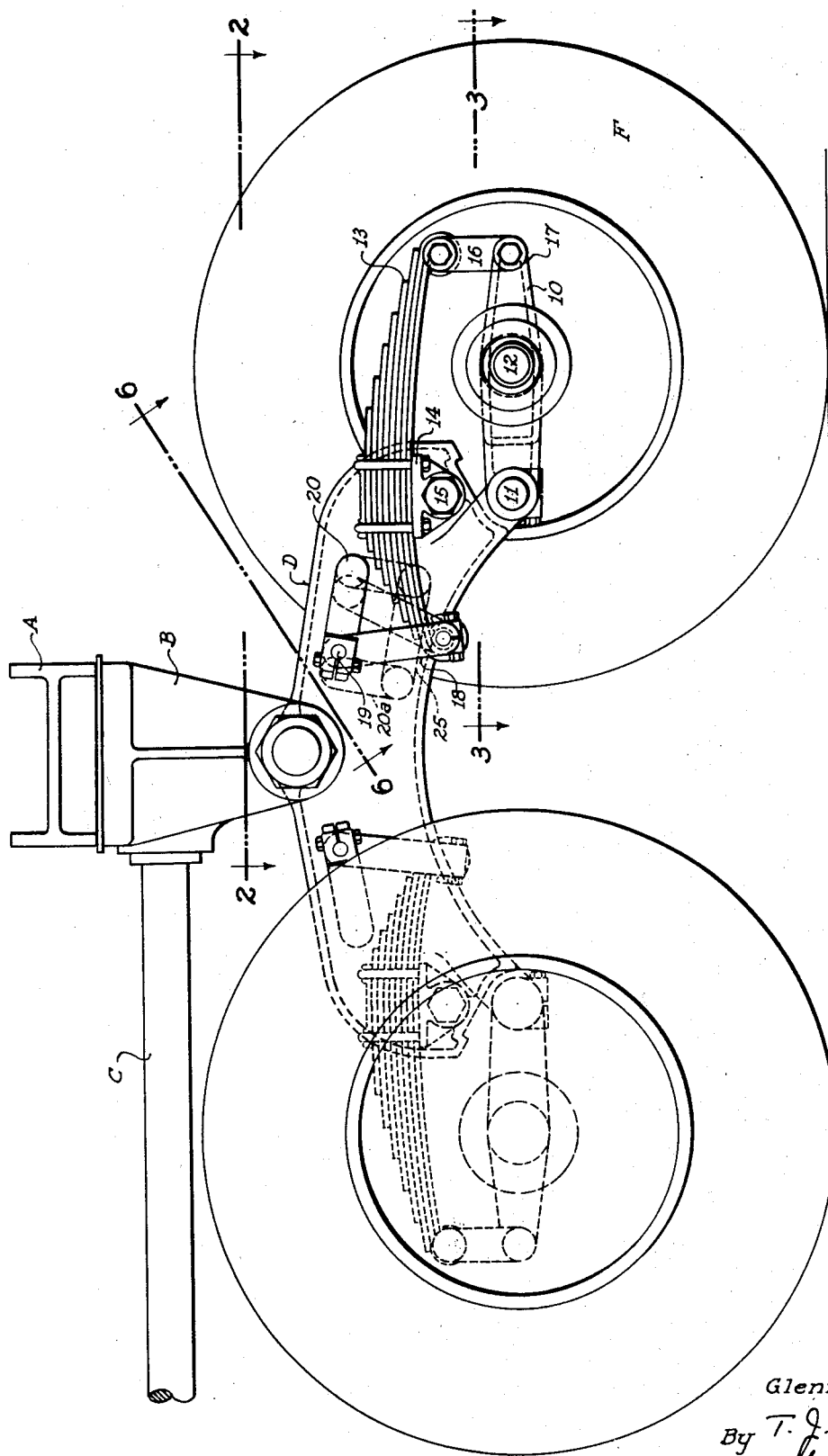
Figure 1 is a side elevation of an eight-wheeled trailer vehicle with the rear wheel on the near side removed in order to show certain parts of the coupling mechanism connecting the springs for each pair of wheel assemblies.

The trailer vehicle shown in Figure 1 comprises the usual load-carrying bunk A, transverse bolster B and attached drawbar C, the bolster B being bifurcated at each end in the conventional manner to receive a rockable equalizer or "walking beam" D. To each end of each "walking beam" a pair of wheel assemblies is hinged and connected to resilient wheel suspensions, the trailer vehicle illustrated thus having two such "walking beams" and four pairs of wheels and corresponding wheel assemblies and suspensions. Since, however, four sets of wheel assemblies and wheel suspensions are identical, the description will be confined to the suspension and assembly for one pair of wheels, thus the pair of rear wheels E and F.

Figure 2:
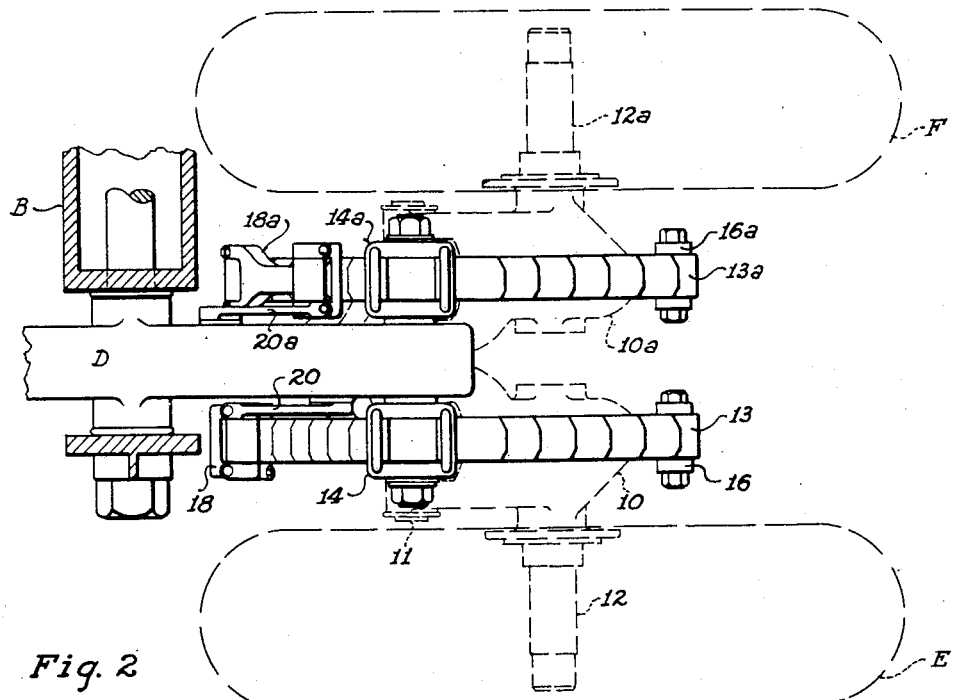
Figure 2 is a fragmentary sectional plan taken on line 2—2 of Figure 1, illustrating the resilient or spring members for a pair of wheel assemblies and the coupling means connecting them, the wheels and wheel mountings being shown in broken lines.
Figure 3:
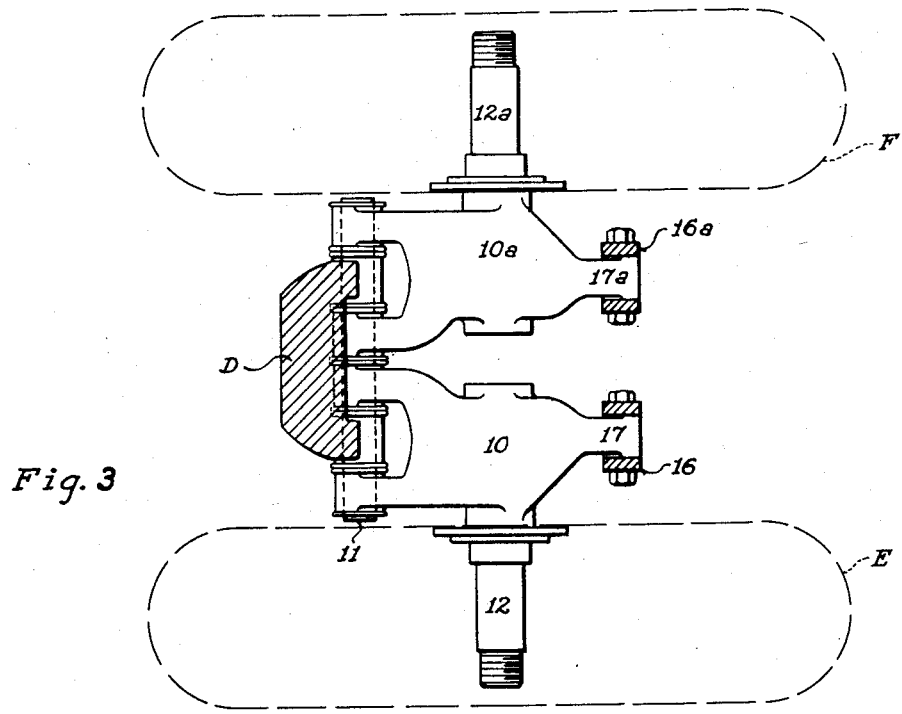
Figure 3 is a similar sectional plan, taken on line 3—3 of Figure 1, showing the hinged wheel mountings.

Referring to Figures 1, 2 and 3, the wheels E and F are so connected to the "walking beam" D that their vertical movements, caused by irregular road surfaces, will always be confined to a pair of parallel planes spaced constantly the same distance apart, and in this respect the wheel mounting is similar to that shown in my United States Letters Patent, No. 2,170,454, and shown in my pending application, Serial No. 223,-275, above mentioned. The wheels E and F are mounted on lever-like brackets 10 and 10a respectively, (see Figures 1 and 3) which are independently hinged to the "walking beam" D on the pin 11. The spindles 12 and 12a, upon which the wheels E and F are rotatably mounted, are made integral with, or are firmly secured in, the brackets 10 and 10a at equal distance from the hinge pin 11, so that the spindles will normally be in horizontal alinement. The other ends of these wheel-carrying brackets or arms 10 and 10a are supported by resilient members in the form of specially designed springs 13 and 13a preferably made up of a series of leaves of graduated lengths formed in a compound curve substantially as shown in Figure 1 and clamped together in cradles 14 and 14a rockably mounted at each side of the walking beam on a shaft 15 secured in the walking beam above the hinge pin 11. The longer spans of the springs 13 and 13a are pivotally connected by means of H-shaped shackles 16 and 16a to the extended ends 17 and 17a of the wheel brackets 10 and 10a respectively, and the shorter spans of the springs 13 and 13a are connected to each other by an arrangement of arms and links which transmits the upward or downward movement of the connected end of one spring to the corresponding end of the other spring but in the opposite direction.

Attention is here directed to the fact that the eccentric location of the cradle rockers 14 and 14a with respect to the spring members 13 and 13a and also the compound curvature of the spring members necessitated thereby, although not absolutely essential to the efficient functioning of my compensating wheel suspension, possess certain important advantages. Firstly, the longer spans of the springs between the rockers and the shackles 16 and 16a are considerably more flexible than the shorter spans between the rockers and the other ends of the spring members and, because of this proportioned flexibility, the spring members are able to absorb sudden and minor vertical movements of the wheels without requiring the compensating interconnecting mechanism at the inner ends of the spring members to function. Secondly, the walking beam may be made shorter than would otherwise be necessary thus bringing the longitudinally aligned pairs of wheels more nearly under the load superimposed on the bunk and bolster,—a feature which is very desirable in any type of trailer vehicle. A third advantage resides in the fact that when the springs act as levers fulcrumed at 14 and 14a, as when one of the wheels encounters a gradual raise or depression in the road surface, the greater part of the movement occurs at the shackle ends of the spring members and the lesser amount at the opposite ends, thus requiring a minimum of motion of the component parts of the coupling mechanism, connecting the inner ends of the spring members, when compensating for the changed wheel positions to equalize the load on both wheels, and minimizing the effect on the walking beam.

The carrying of the wheel spindles 12 and 12a by the brackets 10 and 10a, which brackets in turn are hinged to the "walking beam" D, not only makes it possible to reduce the length of the "walking beam," but also reduces the load on the spring members 13 and 13a. Thus, referring to Figure 1, the position of the wheel spindle 12 with respect to the ends of the wheel bracket 10, thus with respect to the points 14 and 17, will determine the proportionate loads carried at each point. Thus if the spindle 12 is midway between points 14 and 17, the load at point 17, which is the load imposed on spring member 13, will be only one-half of the load carried by the spindle 12 and its wheel, and placing the spindle 12 closer to point 14 will decrease the load on spring member 13 proportionately. This is important in the event of any overloading of the vehicle since the spring member is required to carry only part of the overload, whereas in ordinary vehicle spring mountings, the entire load or overload is imposed on the springs.

The coupling mechanism connecting the inner ends of the spring members 13 and 13a consists of the symmetrical arrangement of connected parts illustrated in Figures 1, 4, 5 and 6. On the inner or the short end of the spring member 13 is rotatably mounted the forked end of an inverted Y-shaped link 18, the upper end of which is journaled on the shaft-like perpendicular extension 19 of a cranked arm 20 the main portion of which cranked arm is parallel to the side of the "walking beam" and to the spring member 13. This cranked arm 20 is also formed with a shaft 21 disposed at right angles to the main portion and journaled in bearings 22 and 23 (Figure 6) provided in the interior of the "walking beam" D. Thus the cranked arm 20 is on the outside of the "walking beam" while the shaft 21 supporting the arm 20 extends within the said walking beam. A depending arm 24 made fast to the shaft 21 between the bearings 22 and 23, is pivotally connected by a yoke or link 25 (Figures 4 and 5) to a similar depending arm 24a forming part of the mechanism coupled to the companion spring member 13a. The corresponding end of the companion spring member, 13a is rotatably mounted in the forked end of an inverted Y-shaped link 18a which link in turn is pivotally carried by the cranked arm 20a similar to the arm 20 and similarly mounted, but on the opposite side of the walking beam. The cranked arms 20 and 20a are parallel but extend in opposite directions, the arm 20 extending away from the cradle 14 towards the short end of spring member 13 and arm 20a extending in opposite direction towards cradle 14a. The shaft 21a, formed as part of the crank 20a and at right angles thereto, passes into the "walking beam" and, journaled in bearings 22a and 23a provided therein. The depending arm 24a is firmly secured to the shaft 21a between the bearings 22a and 23a and is pivotally connected to the yoke or link 25 as previously explained. Thus, each spring member is pivotally connected by means of a forked link to one end of a cranked arm, these cranked arms being oppositely disposed in spaced bearing within the "walking beam" and coupled to each other by the yoke or link 25 connected to their respective dependent arms, all substantially as shown in Figure 4 (in which figure, however, the walking beam is omitted), and as indicated diagrammatically in Figure 5 and shown in true plan in Figure 6.

Since the dimensions of the coupling mechanism are the same on both sides of the walking beam, and since the various parts are symmetrically arranged, movement in one direction of the linkage connected to the spring member 13 causes equal movement in the opposite direction of the linkage associated with the companion spring member 13a, and vice-versa.

By way of example, let it be assumed that the wheel E is gradually raised in passing over a mound on the road surface, causing the hinged bracket 10, on which the wheel E is mounted to describe a short upward arc raising the long end of the spring member 13. Assuming that the spring member 13 is not flexed, the opposite, inner, or short end of the spring member 13 will be moved downwardly an arcuate proportionate distance, and, through the forked link 18, will rotate the crank arm 20 and its depending arm 24 in a short counter-clockwise arc. This movement of the depending arm 24, will be transmitted by the yoke or link 25 to the depending arm 24a, and thence to the journaled shaft 21a of the crank arm 20a. The counter-clockwise rotative force so imparted to the crank arm 20a exerts a corresponding upward pull on the forked link 18a and the short end of the other spring member 13a, thus tending to move the long end of spring member 13a downwardly a distance equal to the distance that the corresponding end of spring member 13 is raised. However, since the wheel F is resting on the ground and therefore cannot be moved downwardly, the force transmitted through the coupling mechanism will act to lift the end of the "walking beam" D slightly. The precise movements of the several parts of the wheel suspension described above will however be materially affected by such factors as the abruptness with which the wheels encounter mounds or depressions in the road surface and the measure of the ability of the spring members to absorb such sudden impacts. This latter is an important additional feature of my invention, since all vertical movements of the wheels are transmitted through the resilient spring members 13 and 13a which are capable of partially absorbing the shocks and thus aiding in decreasing the amount of movement and the force of the impacts on the connecting mechanism and on the "walking beam." In any event, however, each wheel continues to carry its full share of the load.

Figure 7:
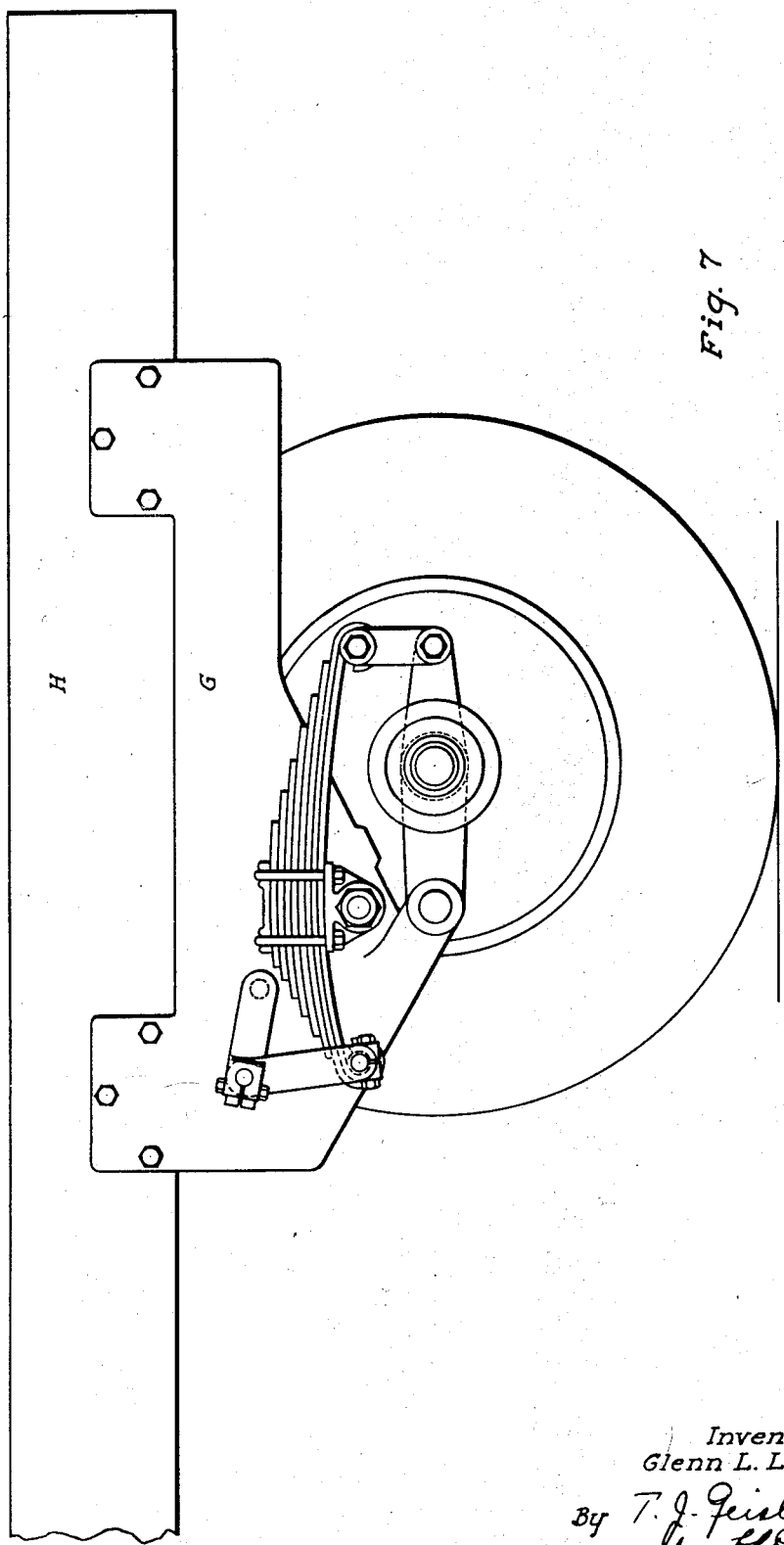
Figure 7 is a side elevation showing my invention applied to a different type of vehicle, the near side wheel having been removed in order to show concealed parts.

The same principle may be applied to the wheel suspensions of vehicles having any number of wheels, provided that the wheels are arranged in pairs, as for example, a four-wheeled vehicle illustrated in Figure 7. In the vehicle illustrated in this figure the wheels are hinged to a rigid hollow member G forming part of the main chassis structure H of the vehicle instead of being hinged to a "walking beam." The chassis member G also carries spring members with connecting mechanism mounted in the same relative positions and functioning in the same manner as previously described.

Figure 8:
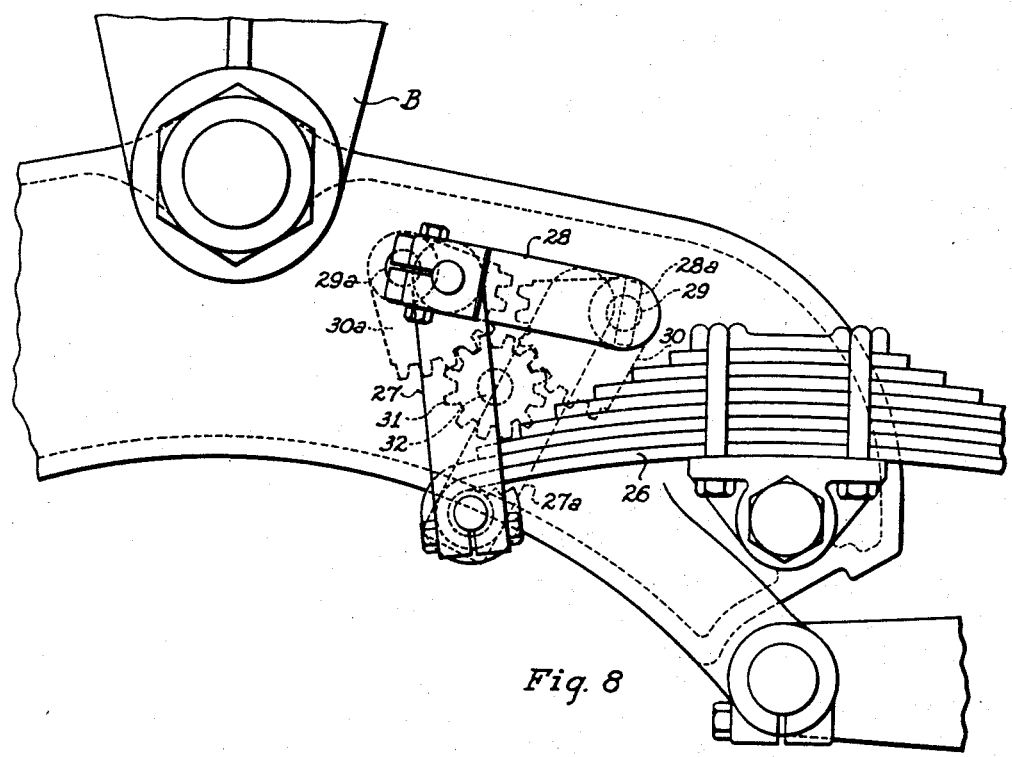
Figures 8 and 9 illustrate modified forms of my invention.
Figure 9:
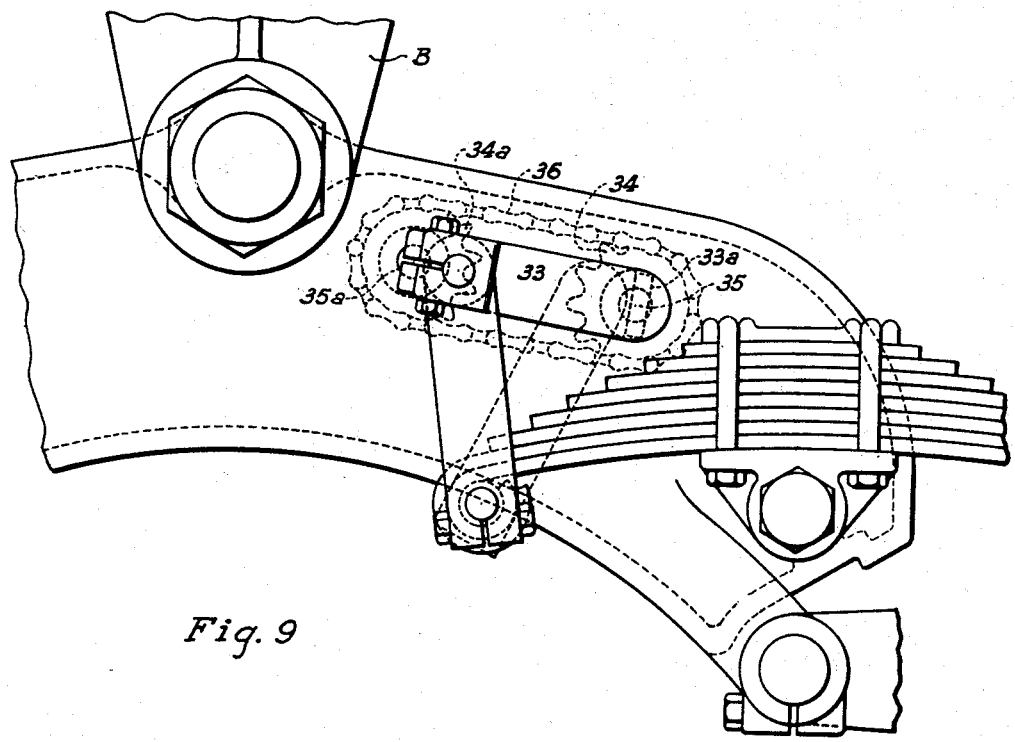

In Figures 8 and 9, I have shown modified coupling means for coordinating the rocking motion of the companion lever-like or spring members. In Figure 8, the short end of spring member 26 is pivotally mounted in the forked end of a link 27, which in turn is pivotally connected to a crank arm 28, having a shaft 29 journaled in the "walking beam" as before, and the companion spring member, (not shown, but located on the other side of the "walking beam"), is similarly connected by a forked link 27a to a crank arm 28a oppositely journaled in the "walking beam" on a shaft 29a,—all in identical manner to that previously described. The modification resides in using a pair of segmental gears and an interposed pinion for connecting the crank arms 28 and 28a, instead of the depending arms and connecting yoke. The gear 30 is firmly clamped or otherwise secured to the crank shaft 29 and meshes with the idling pinion 31 mounted on shaft 32 which is journaled in suitable bearings in the "walking beam," the pinion 31 in turn meshing with the segmental gear 30a secured to the crank shaft 29a. This gear and pinion arrangement functions in exactly the same manner as the linkage of the coupling mechanism previously described and transmits movement from one spring member to produce opposite relative movement on the part of the other spring member.

In the further modification shown in Figure 9, the crank arms 33 and 33a, which are connected to the spring members respectively, in the previously described manner, have sprockets 34 and 34a keyed to the shafts 35 and 35a respectively, and these sprockets in turn are connected by an endless chain 36 substantially as shown. As apparent, movement of one crank arm will produce opposite and equal movement of the other crank arm on the other side of the "walking beam," just as in the coupling mechanism previously described.

It would be possible of course to substitute other modified forms of connecting mechanism coupling the inner or shorter ends of the two parallel lever-like spring members so constructed and arranged that movement of one would produce movement of the other in the opposite direction. The particular connecting mechanism for these members which I have described illustrate practical ways of carrying out my invention. However, it is not my intention to limit my invention to these species, since other modified forms may be used without departing from the principle of my invention.

It would also be possible to construct the parallel lever members differently, but the use of parallel lever springs, mounted in the manner described, I have found it to be entirely practical and satisfactory.

I claim:

1. In a running gear assembly, a walking beam, a pair of resilient lever-like longitudinal members entirely supported by said walking beam and pivotally mounted on opposite sides of said walking beam for movement in parallel vertical planes, the outer ends of said members extending beyond the end of said walking beam, means supported on said walking beam connecting the inner ends of said resilient members, said means including, a pair of cranked arms on opposite sides of said walking beam, the inner ends of said members connected to said cranked arms respectively, and a link connecting said cranked arms so arranged that movement of one cranked arm will produce opposite movement of the other cranked arm.

2. In a vehicle, a mounting for a pair of vehicle wheels including, a walking beam, a pair of wheel-carrying assemblies hinged to said walking beam for up and down movement and supported on said walking beam, a pair of longitudinal resilient lever-like members pivotally mounted on opposite sides of said walking beam for movement in parallel vertical planes, said members entirely supported on said walking beam, the ends of said wheel-carrying assemblies connected to ends of said resilient members respectively, means supported on said walking beam connecting the other ends of said resilient members, said means so constructed and arranged that movement of the latter-mentioned end of one of said resilient members will cause a force to be exerted on the corresponding end of the other resilient member in the opposite direction.

3. In a vehicle, a mounting for a pair of vehicle wheels including, a walking beam, a pair of wheel-carrying arms hinged for up and down movement in parallel longitudinal planes, a wheel spindle carried by each arm, said spindles extending in opposite directions, a pair of spring longitudinal members carried by said walking beam and pivotally mounted on opposite sides of said walking beam for movement in the same parallel longitudinal planes as said wheel-carrying arms, said wheel carrying arms connected to the outer ends of said spring members respectively, means supported on said walking beam connecting the inner ends of said spring members, said means including, a pair of cranked arms on opposite sides of said walking beam, the inner ends of said spring members connected to said cranked arms respectively, and a link connecting said cranked arms so arranged that movement of one cranked arm will produce equal and opposite movement of the other cranked arm.

4. The combination set forth in claim 3 with said means including, a pair of cranked arms on opposite sides of said walking beam, said resilient members connected to said cranked arms respectively, and a series of meshing gears connecting said cranked arms for movement in unison.

5. In a vehicle, a walking beam, a pair of wheel-carrying assemblies hinged to the end of said walking beam for up and down movement in parallel planes, a pair of resilient longitudinal members pivotally mounted on said walking beam for movement in the same parallel planes, as said wheel-carrying assemblies, the outer ends of said resilient members extending beyond the end of said walking beam, the ends of said wheel assemblies connected to the outer ends of said resilient members respectively, a pair of cranked arms on opposite sides of said walking beam, the inner ends of said resilient members connected to said cranked arms respectively, and connecting means between said cranked arms so arranged that movement of one cranked arm will produce equal and opposite movement of the other cranked arm.

6. In a vehicle, a mounting for a pair of wheels including a pair of wheel-carrying assemblies, each of said assemblies including a wheel spindle, said spindles extending in opposite directions, each of said assemblies hinged for up and down movement, the hinges of said assemblies being substantially parallel to said spindles, means connecting said assemblies, said means so constructed and arranged that upward movement of one assembly will cause a force to be exerted in the opposite direction on the other assembly, said means including a pair of parallel longitudinal resilient lever-like members pivoted for up and down movement, an end of each of said members connected to said wheel-carrying assemblies respectively, the other ends of said members connected respectively to a pair of cranked arms, and said cranked arms connected for movement in unison.

7. The combination set forth in claim 6 with the connection between said cranked arms comprising a sprocket attached to each of said cranked arms and a chain connecting said sprockets.

8. In a vehicle, a pair of wheel-assembly supporting members, a pair of wheel-carrying arms hinged to each of said supporting members for up and down movement, a wheel spindle on each arm, the spindles in each pair extending in opposite directions, the hinges connecting said arms to said supporting members being substantially parallel to said spindles, ground-engaging members carried by said spindles, a pair of longitudinally-extending lever-like members pivotally mounted on each wheel-assembly supporting member for up and down movement in planes substantially parallel to the direction of travel of said vehicle, linkage connecting said lever-like members to said arms respectively, and compensating means carried on each wheel-assembly supporting member connecting its pair of lever-like members, said means so constructed and arranged that pivotal movement of one lever-like member will cause a force to be exerted to cause pivotal movement of the other lever-like member in the opposite direction.

9. In a vehicle, a pair of parallel members attached to the vehicle chassis, a pair of wheel-carrying assemblies separately hinged to each of said parallel members, a horizontal wheel spindle in each wheel-carrying assembly, the spindles in each pair of assemblies extending in opposite directions, said assemblies hinged to the parallel members to permit up and down movement in parallel planes of the wheels on said spindles, means connecting each pair of said assemblies, said means including a pair of resilient pivotally mounted levers entirely supported on each of said members, an end of each lever connected to a wheel-carrying assembly respectively, a pair of cranked arms mounted on each member, the opposite ends of said levers connected respectively to said crank arms, the pair of cranked arms on each member interconnected so that movement of one cranked arm will produce movement in the opposite direction of the other cranked arm.

10. In a vehicle compensating wheel mounting, a wheel spindle assembly supporting member, a pair of arms hinged to said member for up and down movement, a wheel spindle carried by each arm, said spindles extending in opposite directions and normally in transverse alignment with each other, a pair of resilient members pivotally-mounted for movement in parallel vertical longitudinal planes, means interconnecting one end of each of said resilient members, said means so arranged and constructed that pivotal movement of one of said resilient members will cause a force to be exerted to tend to cause pivotal movement in the opposite direction on the other resilient member, and linkage connecting said arms to the other ends of said resilient members respectively.

11. The combination set forth in claim 10 with the hinges of said arms being in transverse horizontal alignment and the pivotal points of said resilient members being likewise in transverse horizontal alignment.

12. In a vehicle, a pair of longitudinal members, a pair of wheel-carrying assemblies hinged to each of said members for up and down movement in planes spaced constantly the same distance from said member, a horizontal wheel spindle in each assembly, said wheel spindles extending in opposite directions, compensating means connecting the assemblies in each pair, said compensating means including a pair of parallel longitudinal resilient rockers pivotally mounted on each member, linkage connecting said rockers with said wheel-carrying assemblies respectively, a pair of cranked arms mounted on each member, said rockers connected to said cranked arms respectively, and said cranked arms connected for movement in unison.

GLENN L. LARISON.